Dec. 1, 1925.  
V. L. MILLER  
RETURN BALL  
Filed Nov. 7, 1924

1,563,912

Vernon L. Miller  
Inventor  
by Smith and Freeman  
Attorneys

Patented Dec. 1, 1925.

1,563,912

UNITED STATES PATENT OFFICE.

VERNON L. MILLER, OF ASHLAND, OHIO, ASSIGNOR TO THE FAULTLESS RUBBER COMPANY, OF ASHLAND, OHIO, A CORPORATION OF OHIO.

RETURN BALL.

Application filed November 7, 1924. Serial No. 748,449.

*To all whom it may concern:*

Be it known that I, VERNON L. MILLER, a citizen of the United States of America, and a resident of Ashland, in the county of Ashland and State of Ohio, have invented certain new and useful Improvements in Return Balls, of which the following is a full, clear, and exact description.

In the toy commonly known as a return ball, and consisting of a hollow rubber ball secured to the end of a rubber cord, the cord is ordinarily secured to the ball by inserting the knotted or otherwise enlarged end of the cord through a slit cut in the ball. Obviously a rubber cord so inserted is easily displaced and quickly worn through and the ball after being slit in this manner is devoid of rebounding action. My invention is particularly designed to overcome these defects and to produce a return ball superior to anything heretofore known. In the drawings accompanying this specification and forming a part thereof I have shown, for purposes of illustration, one embodiment which this return ball may assume and one form of apparatus and one process particularly suited to the manufacture of this illustrative form of return ball. In these drawings:—

Figure 3 is a section similar to Figure 2 taken after vulcanization, while

Figure 1:
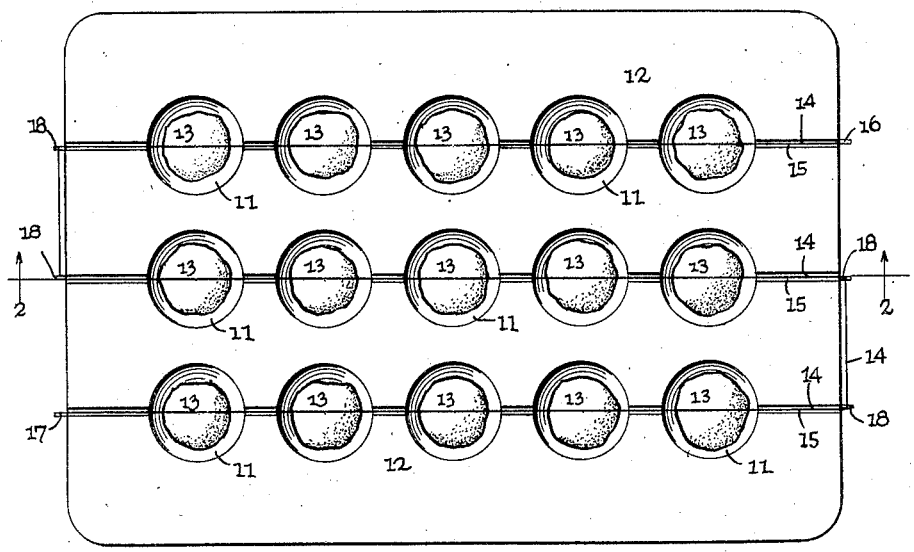
Figure 1 is a plan view of a multiple cavity mold illustrating the first step in the formation of the return ball herein illustrated.
Figure 2:
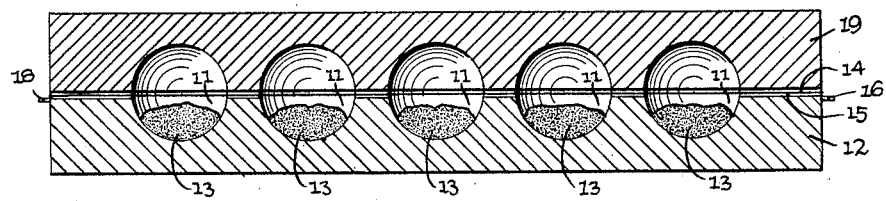
Figure 2 is a section on the line 2—2 of Figure 1 taken after the top half of the mold has been placed in position.
Figure 3:
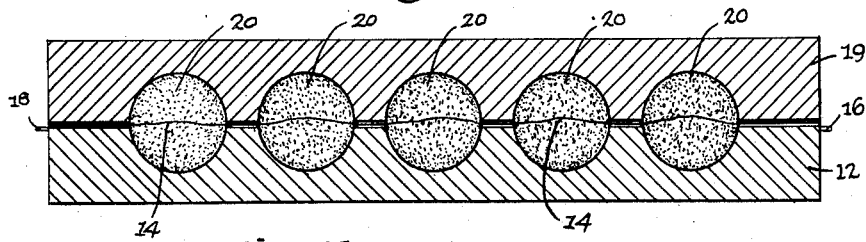
Figure 4:
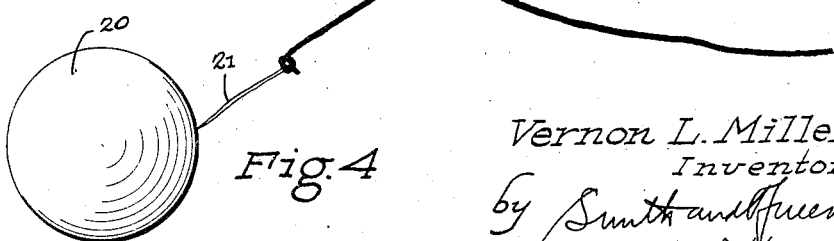
Figure 4 is a general view of the particular form of return ball herein illustrated and described.

According to the process herein illustrated I place, within each of the cavities 11 of the lower mold plate 12, sponge rubber material 13 sufficient in quantity to properly fill upon vulcanization the entire mold cavity, and I then stretch across the openings 11 a cord 14 guided and accommodated, between the openings 11, by a recess 15 in the mold plate 12, and secured in position by means of a pair of end pins 16 and 17 to which the ends of the cord 14 are secured and a plurality of intermediate pins 18 over which the cord 14 extends in its course from one terminal pin 16 across successive rows of cavities 11 to the other terminal pin 17. I then place the top mold plate 19 in position upon the lower mold plate 12 and vulcanize the sponge rubber 13 in the usual manner whereupon the sponge rubber 13 flows up and around the cord 14 to form sponge rubber balls 20 having the cord 14 passing generally diametrically therethrough. I then remove these balls 20 from the mold, sever the cord 14 adjacent one side of each ball 20 to provide each ball 20 with a firmly affixed securing means 21, and then fasten to this securing means 21 an elastic cord such as the rubber cord 22.

It will be obvious from the above description that the return ball so produced is provided with means whereby the elastic cord may be firmly affixed to the ball and at the same time carries the elastic cord affixed in such manner as to in no wise decrease the rebounding action of the ball itself. It will also be apparent that the return ball herein shown and described possesses advantages other than those specifically pointed out herein, that this return ball may be variously changed and modified without sacrificing these advantages, that this return ball or some such modified form thereof may be produced otherwise than by the process and apparatus herein described, that the process and apparatus herein described may be variously changed and modified without sacrificing the advantages thereof and, either in their present form or as thus modified, may be used to produce articles other than the return ball herein illustrated or other than any return ball. It will also be apparent that the ball may be formed of material other than sponge rubber and the securing means of material other than flexible cord. It will therefore be obvious that the disclosure herein is illustrative only and that my invention is not limited thereto.

I claim:

1. A return ball unit comprising a sponge rubber ball, a relatively long life securing member extending into said ball and secured thereto by vulcanization of said ball, and an elastic cord renewably attached to said securing member.

2. A return ball unit comprising a sponge rubber ball adapted to rebound when moved against an object, an elastic cord, and means secured to said cord, extending into said ball, and secured to said ball by vulcanization of said ball and without materially decreasing the rebounding properties of said ball.

3. A return ball unit comprising a sponge rubber ball adapted to rebound when moved against an object, a relatively long life securing member extending into said ball and secured thereto by vulcanization of said ball and without materially decreasing the rebounding properties of said ball, and an elastic cord renewably attached to said securing member.

4. A return ball unit comprising a sponge rubber ball, a securing member extending into said ball and secured to said ball by vulcanization, and an elastic cord secured to said securing member.

5. In combination, a sponge rubber ball, and a securing member extending into said ball and secured to said ball by vulcanization.

6. A return ball unit comprising a sponge rubber ball, a relatively long life securing member extending into said ball and secured thereto by vulcanization, and an elastic cord renewably attached to said securing member.

7. A return ball unit comprising a sponge rubber ball adapted to rebound when moved against an object, an elastic cord, and means secured to said cord, extending into said ball, and secured to said ball by vulcanization and without materially decreasing the rebounding properties of said ball.

8. A return ball unit comprising a sponge rubber ball adapted to rebound when moved against an object, a relatively long life securing member extending into said ball and secured thereto by vulcanization and without materially decreasing the rebounding properties of said ball, and an elastic cord renewably attached to said securing member.

9. A return ball unit comprising a sponge rubber ball, a securing member extending into said ball and secured to said ball by vulcanization of said ball, and an elastic cord secured to said securing member.

10. In combination, a sponge rubber ball, and a securing member extending into said ball and secured to said ball by vulcanization of said ball.

In testimony whereof, I hereunto affix my signature.

VERNON L. MILLER.